(12) United States Patent
Kaku et al.

(10) Patent No.: US 8,833,837 B2
(45) Date of Patent: Sep. 16, 2014

(54) UTILITY VEHICLE

(71) Applicant: Kawasaki Jukogyo Kabushiki Kaisha, Hyogo (JP)

(72) Inventors: Hidetoshi Kaku, Kakogawa (JP); Yoshinori Tsumiyama, Miki (JP); Tyler Furman, Lincoln, NE (US); Takashi Hisamura, Lincoln, NE (US)

(73) Assignee: Kawasaki Jukogyo Kabushiki Kaisha, Hyogo (JP)

(*) Notice: Subject to any disclaimer, the term of this patent is extended or adjusted under 35 U.S.C. 154(b) by 0 days.

(21) Appl. No.: 13/728,073

(22) Filed: Dec. 27, 2012

(65) Prior Publication Data

US 2014/0183903 A1   Jul. 3, 2014

(51) Int. Cl.
*B62D 25/24* (2006.01)
*B62D 25/00* (2006.01)
*B62D 33/037* (2006.01)

(52) U.S. Cl.
CPC .................................. *B62D 33/037* (2013.01)
USPC ...................................................... 296/183.2

(58) Field of Classification Search
CPC .......... B60N 2/24; B60N 2/3075; B60N 2/36; B60N 2/012; B60N 2/015; B62D 33/02; B62D 33/037; B62D 33/0273; B60R 21/13
USPC .......... 296/183.2, 65.01, 65.09, 26.09, 183.1, 296/186.4, 186.5, 190.11
See application file for complete search history.

(56) References Cited

U.S. PATENT DOCUMENTS

| | | | | |
|---|---|---|---|---|
| 3,169,792 | A * | 2/1965 | Solano Viquez | 296/99.1 |
| 3,592,504 | A * | 7/1971 | Sandor | 296/70 |
| 4,076,301 | A * | 2/1978 | Gergoe | 296/50 |
| 4,480,868 | A * | 11/1984 | Koto | 296/190.11 |
| 6,550,849 | B1 * | 4/2003 | Dosdall | 296/183.1 |
| 6,905,159 | B1 | 6/2005 | Saito et al. | |
| 7,581,780 | B2 * | 9/2009 | Shimamura et al. | 296/183.2 |
| 7,841,639 | B2 * | 11/2010 | Tanaka et al. | 296/65.05 |
| 2011/0169289 | A1 * | 7/2011 | Arnold et al. | 296/10 |
| 2011/0188979 | A1 * | 8/2011 | Ketels et al. | 414/519 |

* cited by examiner

*Primary Examiner* — Glenn Dayoan
*Assistant Examiner* — Sunsurraye Westbrook
(74) *Attorney, Agent, or Firm* — Wenderoth, Lind & Ponack, L.L.P.

(57) ABSTRACT

A utility vehicle according to the present invention includes a chassis, one or more seat rows arranged on the chassis, a cargo bed arranged behind the seat row(s), the cargo bed turnably supported at a pivot of the chassis so as to be changeable between a normal position in which a front portion of the cargo bed is not raised and a dumping position in which the front portion of the cargo bed is raised, and cargo bed locking mechanisms capable of locking the cargo bed in the normal position to the chassis, the cargo bed locking mechanisms each having a grip of a locking operating lever arranged at a front of the cargo bed.

4 Claims, 5 Drawing Sheets

UTILITY VEHICLE

BACKGROUND OF THE INVENTION

1. Field of the Invention

The present invention relates to a utility vehicle. More specifically, the present invention relates to a utility vehicle including one or more seat rows arranged on a chassis, and a cargo bed arranged behind the seat rows, the cargo bed enabling a dumping operation.

2. Description of the Prior Art

A utility vehicle including a cargo bed enabling a dumping operation is disclosed in e.g., U.S. Pat. No. 6,905,159.

In the utility vehicle described in the document, the rear end of the cargo bed is turnably supported on a chassis, and when lowered into a normal position, the cargo bed is locked to the chassis by a cargo bed locking mechanism.

For the dumping operation of the cargo bed, the locked state by the cargo bed locking mechanism is released, a front end of the cargo bed is then raised manually or by using an assist mechanism having a dumper member.

In the conventional example, the operating portion of the cargo bed locking mechanism is arranged sideward of a side panel of the cargo bed. Specifically, a grip of an operating lever is arranged so as to project sideward from the side panel.

Therefore, when the cargo bed is raised from the normal position into the dumping position, the operator needs to get out of the vehicle once to go to near the side panel sideward of the cargo bed, and then needs to operate the operating lever of the cargo bed locking mechanism to release the locking of the cargo bed. That is, for the dumping operation of the cargo bed, the operator needs to get out of the vehicle once. Consequently, it takes time to perform the locking releasing operation.

SUMMARY OF THE INVENTION

An object of the present invention is to provide a utility vehicle in which the sitting operator can easily release the locking of a cargo bed by operating a grip arranged at a front of the cargo bed and the grip of a cargo bed locking mechanism can be arranged in the space of a ROPS without projecting sideward from the cargo bed.

To achieve the above object, a utility vehicle according to the present invention includes a chassis, one or more seat rows arranged on the chassis, a cargo bed arranged behind the seat row(s), the cargo bed turnably supported at a pivot of the chassis so as to be changeable between a normal position in which the front portion of the cargo bed is not raised and a dumping position in which the front portion of the cargo bed is raised, and cargo bed locking mechanisms capable of locking the cargo bed in the normal position to the chassis, the cargo bed locking mechanisms each having a grip of a locking operating lever arranged at the front of the cargo bed.

With the above configuration, the sitting operator can release the locking of the cargo bed by operating the grip at the front of the cargo bed. In addition, the grip can be arranged in the internal space of a ROPS without projecting sideward from the cargo bed. Therefore, the appearance of the vehicle can be maintained, and the grip can be protected from the outside.

The utility vehicle can preferably adopt the following configurations.

(a) The cargo bed locking mechanisms are a left cargo bed locking mechanism arranged on the left side of the cargo bed, and a right cargo bed locking mechanism arranged on the right side of the cargo bed.

With the above configuration, the right and left ends of the cargo bed can be fixed onto the chassis so as to be substantially equally positioned. The cargo bed can thus be maintained in a stable state. Therefore, the cargo bed is less likely to rattle during driving. In addition, the locking releasing operation can be performed from either of the right and left. The operability is thus good.

(b) In the utility vehicle including the right and left cargo bed locking mechanisms, the right and left locking operating levers are coupled to each other so as to be integrally operated by a coupling member arranged on the lower side of the cargo bed and extending to the right and left.

With the above configuration, both the right and left cargo bed locking mechanisms can be released by simply operating either of the right and left operating levers.

(c) In the utility vehicle in which the right and left cargo bed locking mechanisms are coupled to each other, each of the cargo bed locking mechanisms includes the operating lever turnably supported on each of the side walls of the cargo bed, a hook member turnably supported on the lower side of the cargo bed, a coupling link coupling the operating lever and the hook member, and a hook receiving member provided on the chassis and with which the hook member is engageable.

With the above configuration, the operating lever operated by the operator and the cargo bed locking mechanism are coupled via the coupling link. Therefore, the operating lever can be arranged near the upper end of the cargo bed where the locking mechanism can be easily operated. The operability can thus be improved. In addition, the operating force can be reduced by using a lever ratio.

DETAILED DESCRIPTION OF THE PREFERRED EMBODIMENTS

Figure 1:
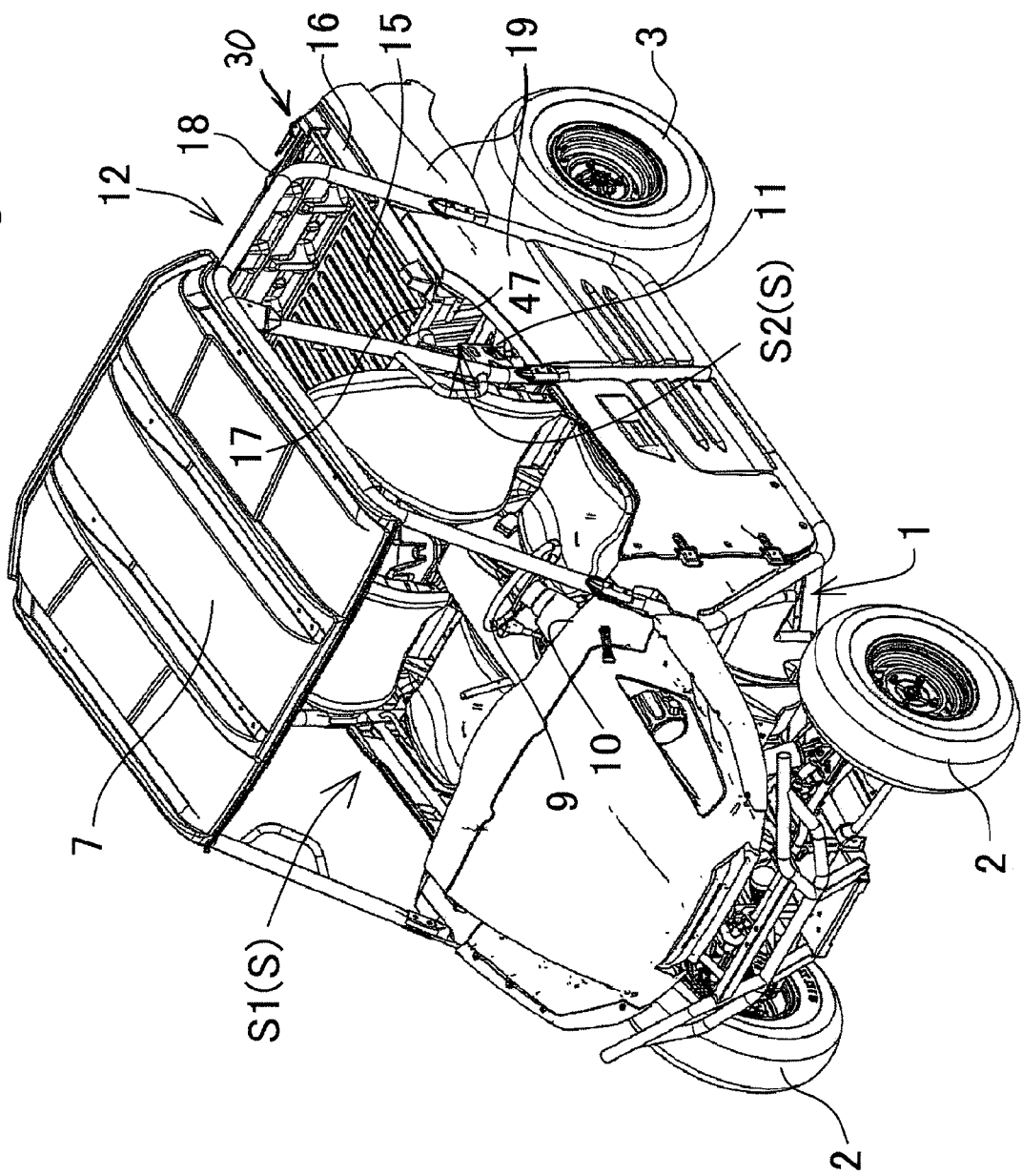
FIG. 1 is a perspective view of a utility vehicle according to the present invention.

An example of the present invention will be described with reference to FIGS. 1 to 5. FIG. 1 is a perspective view of an example of a utility vehicle according to the present invention. In the utility vehicle, a chassis 1 is provided with right and left front wheels 2 at the front thereof, and right and left rear wheels 3 at the rear thereof. Space S over the chassis 1 between the front wheels 2 and the rear wheels 3 is surrounded by a ROPS 5 having a roof 7. Space S has a front riding space (cabin) S1, and rear storage space S2. In riding space S1, a front seat row including right and left front seats 8, a steering wheel 9, and a dashboard 10 are arranged. In storage space S2, right and left storage boxes 11 are arranged. A cargo bed 12 is provided behind storage space S2, the cargo bed 12 enabling a dumping operation. A hood 13 is provided in front of riding space S1. External covers 19 for design are arranged on the right and left sides of the cargo bed 12 and in storage space S2.

Figure 2:
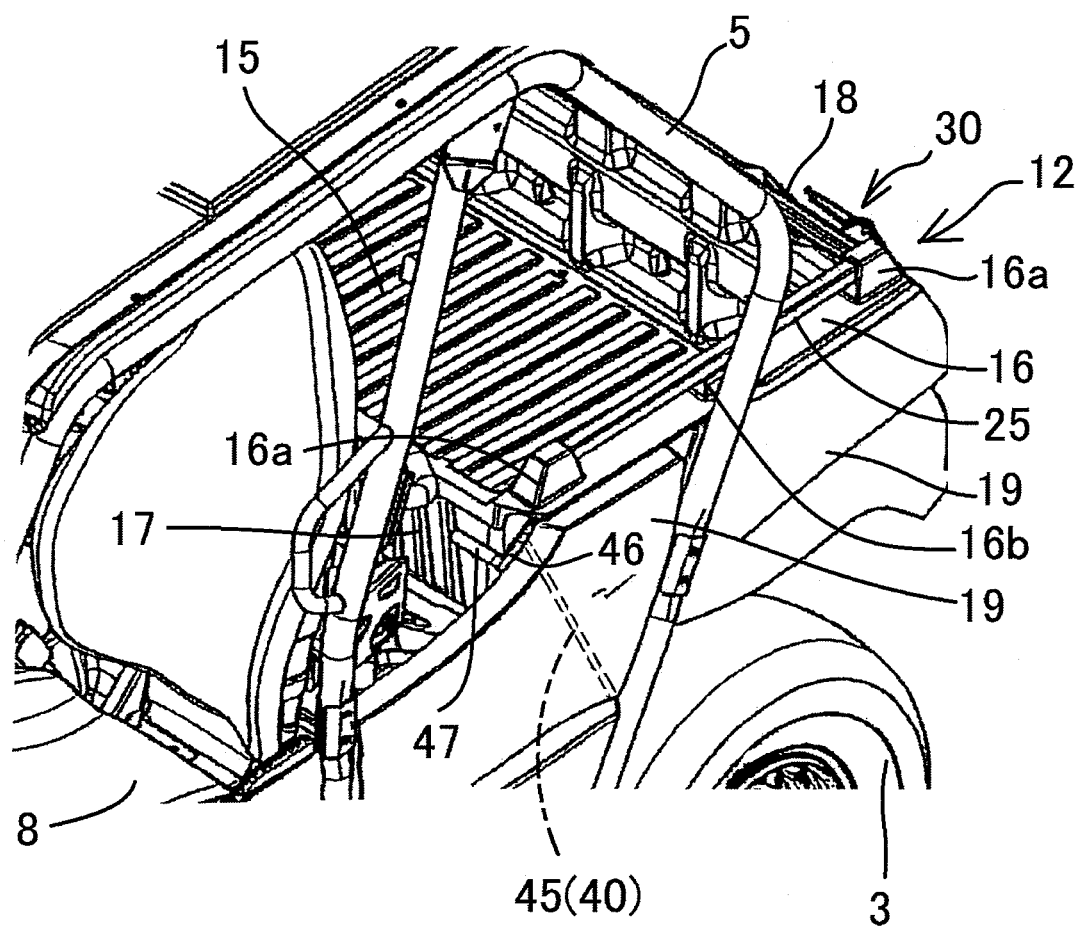
FIG. 2 is an enlarged view of an essential part of FIG. 1.

FIG. 2 is an enlarged view of an essential part of FIG. 1. The cargo bed 12 has a bottom plate 15, right and left side panels 16, a front panel 17, and a tail panel (rear panel) 18. The front panel 17, the right and left side panels 16, and the bottom plate 15 are integrally formed by injection molding using a resin material. The tail panel 18 is an openable and closable gate-type panel, the tail panel 18 being formed of a member different from that of the front panel 17, the side panels 16, and the bottom plate 15.

Pipe supporting legs 16a are integrally formed on each of the side panels 16 at the front and rear ends on the upper surface of the side panel 16, the pipe supporting legs 16a projecting upward. A metal square pipe 25 is supported between the pipe supporting legs 16a, the square pipe 25 extending along substantially the entire length of the side panel 16. In addition, an intermediate supporting leg 16b is integrally formed on the side panel 16 in the middle portion in the front-rear direction on the upper surface of the side panel 16. The intermediate supporting leg 16b supports the middle portion in the front-rear direction of the square pipe 25 from below. The square pipe 25 can be used for many applications of e.g., roping and fixing a load and of attaching an accessory.

Figure 4:
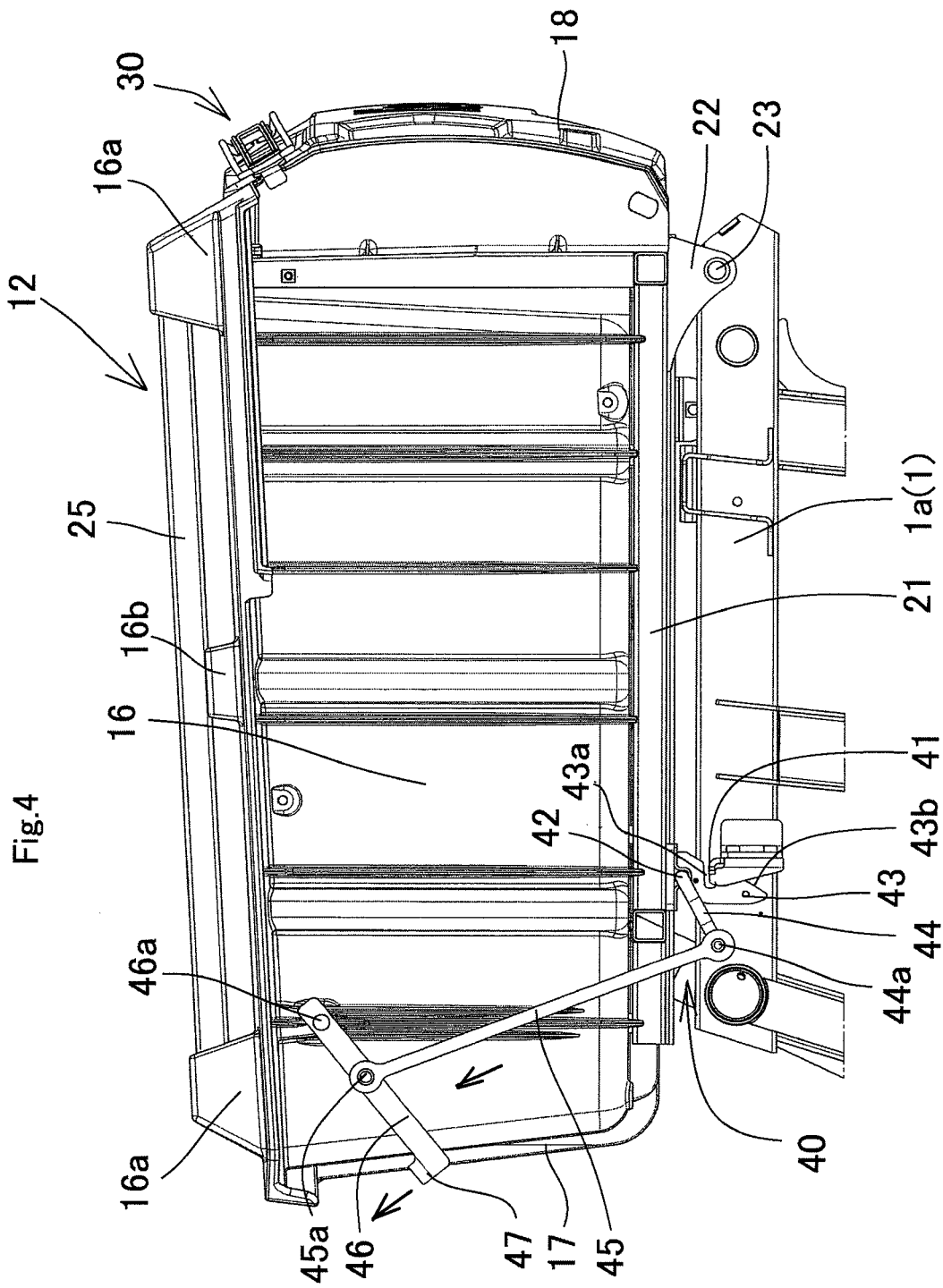
FIG. 4 is a side view of the cargo bed in a normal position.

FIG. 4 is a left side view of the cargo bed 12 in which the external cover 19 (FIG. 2) is detached. A bottom frame 21 made of a metal pipe is fixed to the lower end of the cargo bed 12. A bracket 22 is provided at the rear end of the bottom frame 21, the bracket 22 being turnably supported at the rear end of a rear frame 1a of the chassis 1 via a horizontal dumping support shaft 23. Thereby, the front end of the cargo bed 12 can be raised and lowered about the dumping support shaft 23. That is, the dumping operation is enabled.

Right and left cargo bed locking mechanisms 40 are provided at the front ends of the bottom frames 21, and the cargo bed locking mechanisms 40 locks the cargo bed 12 into a normal position (non-dumping position).

The left cargo bed locking mechanism 40 shown in FIG. 4 has a hook receiver 41 provided at the front end of the rear frame 1a of the chassis 1, a turning shaft 42 turnably supported on the lower surface at the front end of the bottom frame 21, a movable hook 43 fixed to the turning shaft 42 so as to be integrally turnable, a turning arm 44 integrally formed to the turning shaft 42 and extending forward, a link 45 coupled to the turning arm 44 via a pin 44a and extending upward along the side surface of the side panel 16, and an operating lever 46 coupled to the upper end of the link 45 via a pin 45a.

The operating lever 46 is arranged along the outer side surface of the side panel 16. The rear end of the operating lever 46 is turnably supported on the side panel 16 via a support shaft 46a. The operating lever 46 extends forward and downward along the outer side surface of the side panel 16. The operating lever 46 is formed at the front end thereof with a grip 47 that is located at the front of the front panel 17 and projecting inward in the vehicle width direction.

The movable hook 43 is formed in a wedge shape and having a width in the front-rear direction narrowed downward, seen from the side. The movable hook 43 has in the upper portion thereof an engaging recess 43a that is opened rearward.

Figure 3:
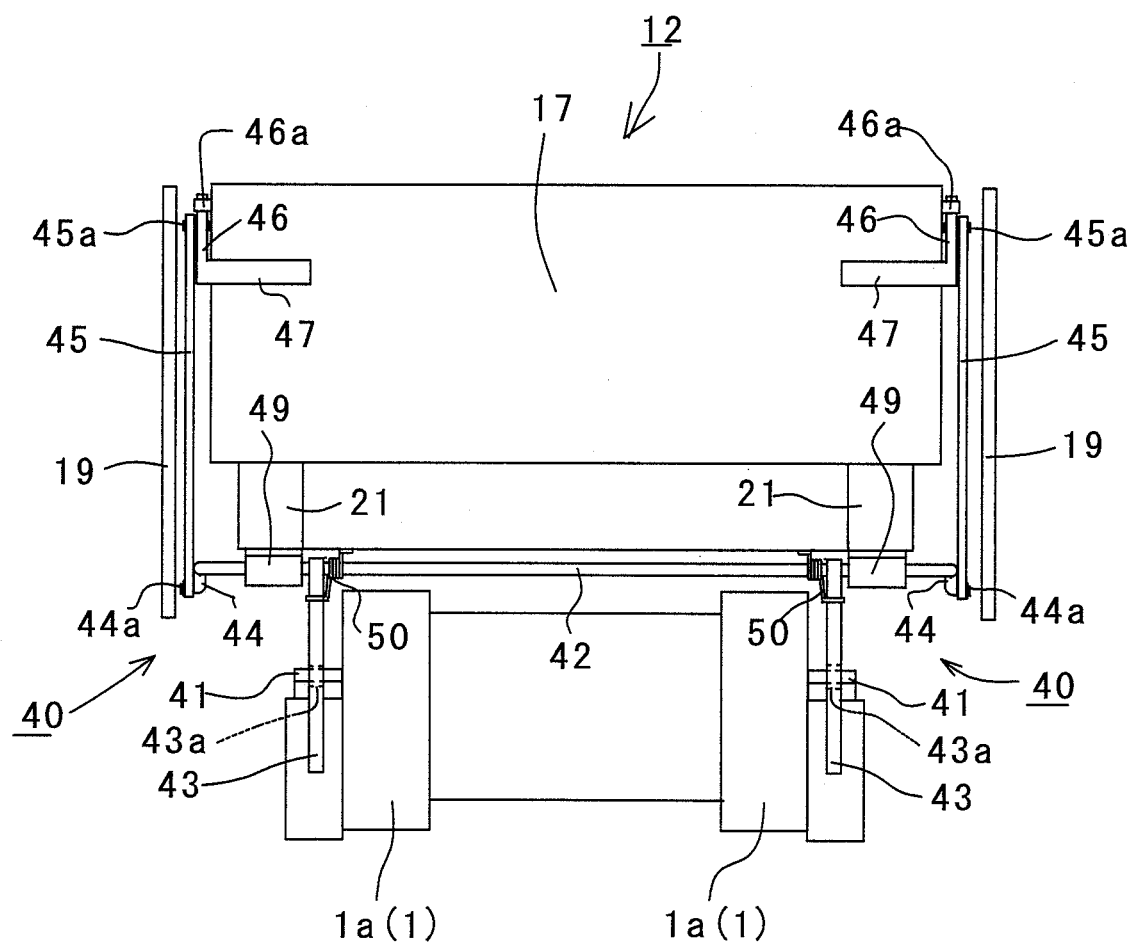
FIG. 3 is a front view of a cargo bed of the utility vehicle of FIG. 1.

FIG. 3 is a front view of the cargo bed. The grip 47 of the left operating lever 46 is located at the front of the front panel 17, and is exposed to the outside. On the other hand, the left operating lever 46 and the left link 45 arranged along the outer side surface of the left side panel 16 are covered with the left external cover 19, and are hidden from the outside.

The turning shaft 42 is arranged along substantially the entire width of the cargo bed 12, and is turnably supported by shaft supporting members 49 fixed on the lower side of the cargo bed 12. The right and left movable hooks 43 are fixed to the right and left ends of the turning shaft 42. That is, the right and left movable hooks 43 are fixed to the shared turning shaft 42, and are turned always integrally. Therefore, both the right and left movable hooks 43 are turned by turnably operating either of the right and left movable hooks 43.

The cargo bed locking mechanism 40 arranged on the right side of the cargo bed 12 has the same configuration as the cargo bed locking mechanism 40 arranged on the left side. The grip 47 of the right operating lever 46 is located at the front of the front panel 17 of the cargo bed 12. The coupling link 45 is arranged between the right side panel 16 and the right external cover 19.

Figure 5:
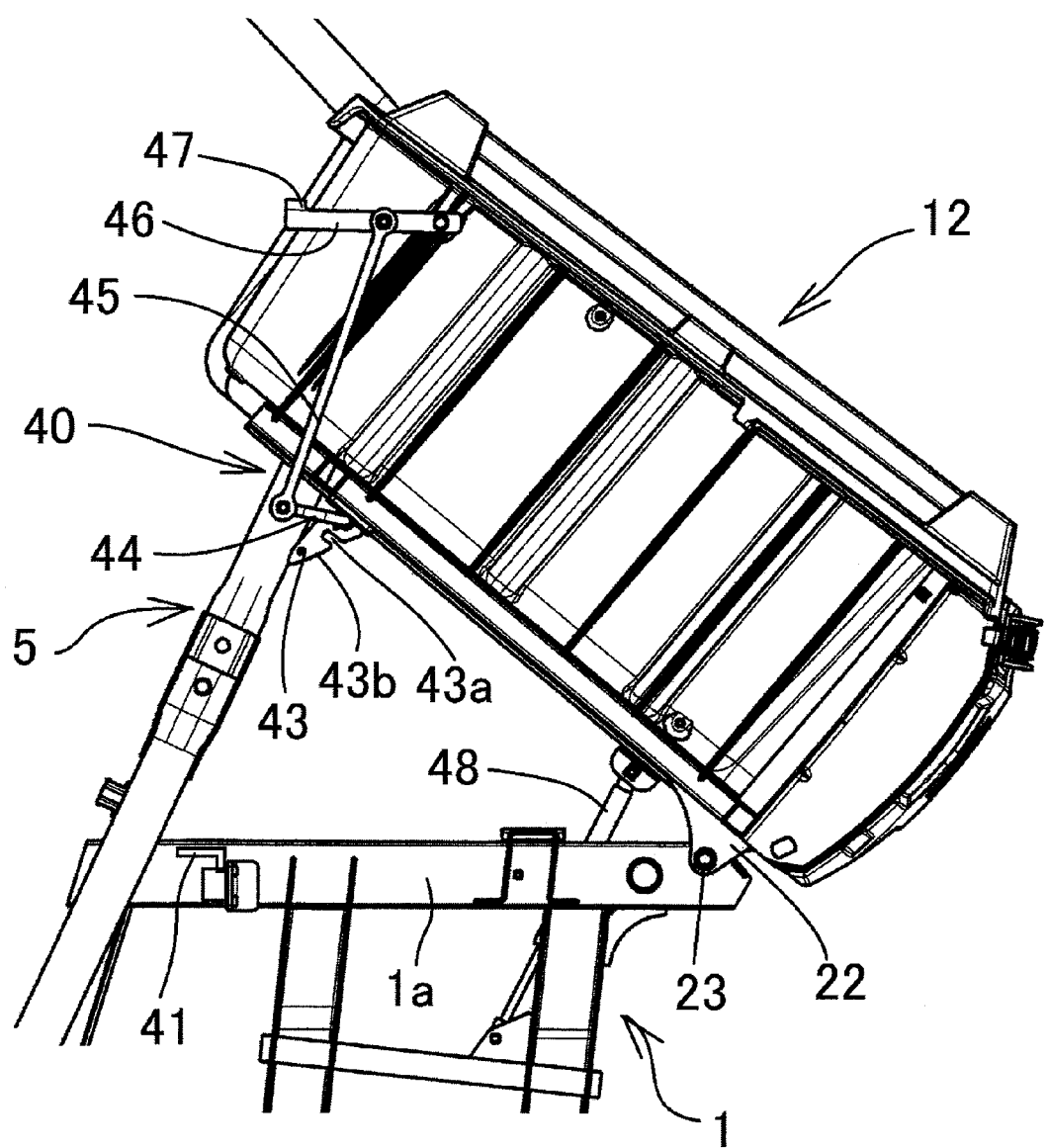
FIG. 5 is a side view of the cargo bed in a dumping position.

In FIG. 5, a hydraulic cylinder (hydraulic dumper) 48 is provided on the lower surface of the cargo bed 12. The hydraulic cylinder 48 is an assist mechanism at the time of dumping. The hydraulic cylinder 48 biases the cargo bed 12 upward.

As shown in FIG. 3, the hook 43 of the cargo bed locking mechanism 40 is biased rearward by a torsional coil spring 50.

The damping operation will be described. In FIG. 4, the cargo bed 12 is locked in the normal position, and the hook 43 is biased rearward by the torsional coil springs 50 (see FIG. 3) so as to be engaged with the hook receiver 41. When the grip 47 of either of the right and left operating levers 46 is raised from the state of FIG. 4 by an operator, the link 45 is raised to turn the turning arm 44 and the movable hook 43 forward, so that the recess 43a of the movable hook 43 is disengaged from the hook receiver 41. At this time, the movable hook 43 of the other of the right and left cargo bed locking mechanisms 40 is also disengaged from the corresponding hook receiver 41. Thereby, the right and left cargo bed locking mechanisms 40 are released from the locking state, so that as shown in FIG. 5, the front end of the cargo bed 12 can be raised about the support shaft 23. Even when a load is heavy, the cargo bed 12 can be raised by a light operation force with an assist of the hydraulic cylinder 48, and can be held into a dumping position.

When the cargo bed 12 is raised, the operator releases his/her hand from the grip 47. The operating lever 46 is lowered by the resilient force of the torsional coil springs 50.

When the cargo bed is lowered from the dumping position of FIG. 5 to the normal position of FIG. 4, the operator is not required to operate the operating lever 46. That is, when the cargo bed 12 is pushed down from the dumping position against the biasing force of the hydraulic cylinder 48, an inclined rear edge 43b of the movable hook 43 is abutted onto the hook receiver 41 at the final stage of the lowering of the cargo bed 12. The movable hook 43 is pushed forward, so that the recess 43a is lowered into the position corresponding to the hook receiver 41. The, the movable hook 43 is turned rearward by the torsional coil springs 50, so that the recess 43a is engaged with the hook receiver 41.

Effects of the Example (1) In FIG. 4, the cargo bed locking mechanism 40 locking the cargo bed 12 enabling the dumping operation into the normal position is provided, and the grip 47 of the locking operating lever 46 capable of releasing the locking of the cargo bed locking mechanism 40 is arranged at the front of the front panel 17 of the cargo bed 12. Therefore, the sitting operator can release the locking of the cargo bed 12 by operating the grip 47 at the front of the cargo bed 12. It does not take time to perform the locking releasing operation.

(2) In FIG. 3, the grip 47 for releasing the locking can be arranged in internal space S of the ROPS 5 without projecting sideward from the cargo bed 12. Therefore, the appearance of the vehicle can be maintained, and the grip 47 can be protected from the outside.

(3) In FIG. 3, the right and left cargo bed locking mechanisms 40 are provided. The right and left ends of the cargo bed 12 can be fixed onto the chassis 1 so as to be substantially equally spaced. The cargo bed 12 can thus be maintained in a stable state. Therefore, the cargo bed is less likely to rattle during driving. In addition, the locking releasing operation can be performed from either of the right and left. The operability is thus good.

(4) In FIG. 3, the right and left locking operating levers 46 are coupled to each other so as to be integrally operated by the turning shaft 42 arranged on the lower side of the cargo bed 12. Both the right and left cargo bed locking mechanisms 40 can be released by simply operating either of the right and left operating levers 46.

(5) In FIG. 4, the cargo bed locking mechanism 40 includes the operating lever 46 turnably supported on the side panel 16 of the cargo bed 12, the hook 43 turnably supported on the lower side of the cargo bed 12, the coupling link 45 coupling the operating lever 46 and the hook 43, and the hook receiver 41 provided on the chassis 1 and with which the hook 43 is engageable. Therefore, the grip 47 of the operating lever 46 can be arranged near the upper end of the cargo bed 12 where the cargo bed locking mechanism 40 can be easily operated. The operability can thus be improved. In addition, the operating force can be reduced by using the lever ratio of the operating lever 46.

Other Embodiments (1) The present invention is applicable to a four-passenger utility vehicle including front and rear seat rows. In addition, the present invention is applicable to a utility vehicle in which a bench type seat is arranged.

(2) The present invention is not limited to the configuration of the example, and includes various modification examples contemplated in the scope without departing from the contents described in the claims.

What is claimed is:

1. A utility vehicle comprising:
   a chassis;
   a seat row arranged on the chassis;
   a cargo bed arranged behind the seat row, the cargo bed being turnably supported at a pivot of the chassis so as to be changeable between a normal position in which a front portion of the cargo bed is not raised and a dumping position in which the front portion of the cargo bed is raised; and
   cargo bed locking mechanisms capable of locking the cargo bed in the normal position to the chassis, the cargo bed locking mechanisms each including a locking operating lever having a grip, the grip of each locking operating lever being arranged at a front of a front panel of the cargo bed.

2. The utility vehicle according to claim 1, wherein
   the locking mechanisms are a left cargo bed locking mechanism arranged on a left side of the cargo bed, and a right cargo bed locking mechanism arranged on a right side of the cargo bed.

3. The utility vehicle according to claim 2, wherein
   the locking operating levers of the left and right cargo bed locking mechanisms are coupled to each other so as to be integrally operated by a coupling member arranged on a lower side of the cargo bed and extending in right and left directions.

4. The utility vehicle according to claim 3, wherein
   the locking operating levers of the left and right cargo bed locking mechanisms are turnably supported on left and right side walls of the cargo bed, respectively,
   and wherein each of the left and right cargo bed locking mechanisms includes:
   a hook member turnably supported on the lower side of the cargo bed;
   a coupling link coupling the locking operating lever and the hook member; and
   a hook receiving member provided on the chassis and with which the hook member is engageable.

* * * * *